United States Patent [19]
Ketcham

[11] Patent Number: 5,338,598
[45] Date of Patent: Aug. 16, 1994

[54] SINTERED INORGANIC COMPOSITES COMPRISING CO-SINTERED TAPE REINFORCEMENT

[75] Inventor: Thomas D. Ketcham, Big Flats, N.Y.

[73] Assignee: Corning Incorporated, Corning, N.Y.

[21] Appl. No.: 991,633

[22] Filed: Dec. 14, 1992

[51] Int. Cl.$^5$ .............................................. B32B 9/00
[52] U.S. Cl. .................................. 428/210; 428/209; 428/688; 428/114
[58] Field of Search ............... 428/210, 427, 209, 406, 428/688, 689, 323, 426, 433, 901, 114; 361/401–404

[56] References Cited

U.S. PATENT DOCUMENTS

| | | | |
|---|---|---|---|
| 3,047,409 | 7/1962 | Slayter | 428/406 |
| 4,424,251 | 1/1984 | Sugishita | 428/427 |
| 4,615,987 | 10/1986 | Chyung et al. | 501/8 |
| 4,626,515 | 12/1986 | Chyung et al. | 501/32 |
| 4,656,071 | 4/1987 | Virkar | 428/36 |
| 4,677,009 | 6/1987 | Virkar | 428/36 |
| 4,714,257 | 12/1987 | Heinrich et al. | 277/1 |
| 4,879,156 | 11/1989 | Herron | 428/210 |
| 4,954,480 | 9/1990 | Imanaka | 428/688 |
| 5,053,175 | 10/1991 | Birchall et al. | 264/60 |
| 5,059,582 | 10/1991 | Chung | 505/1 |
| 5,089,455 | 2/1992 | Ketcham et al. | 501/104 |
| 5,102,720 | 4/1992 | Raj | 428/210 |

FOREIGN PATENT DOCUMENTS

0441528A1 8/1991 European Pat. Off. ....... B32B 18/00

OTHER PUBLICATIONS

Weeton, "Engineer's Guide to Composite Materials" ASM, 1990, pp. 1–1 to 1–10, 3–6 to 3–7, 5–2 to 5–4, 5–14 to 5–17 and 8–20 to 8–22.

J. G. Pepin et al., "Electrode-Based Causes of Delaminations in Multilayer Ceramic Capacitors", J. Am. Ceram. Soc., 72 [12] 2287–91 (1989).

K. G. Shaw, "Fabrication of Plasma Sprayed Composite Structures", Proc. American Society for Composites, Sixth Technical Conference, pp. 145–153, Technomic Publishing Company, Lancaster, Pa. (1991).

J. H. Givens et al., "Metal Matrix Composites: Titanium Nitride Films as Microlaminate Reinforcements", Metal & Ceramic Matrix Composites: Processing, Modeling & Mechanical Behavior, (R. B. Bhagat et al. Ed.), pp. 587–596, The Minerals, Metals & Materials Soc., 1990.

M. Yasrebi et al., "Biomimetic Procesing of Ceramics and Ceramic-Metal Composites" Mat. Res. Soc. Symp. Proc. vol. 180, pp. 625–635 (1990).

W. J. Clegg et al., "A simple way to make tough ceramics", Nature vol. 347, pp. 455–457 (Oct. 4 1990).

D. B. Marshall et al., "Enhanced Fracture Toughness in Layered Microcomposites of Ce-$ZrO_2$ and $Al_2O_3$", J. Am. Ceram. Soc., 74 [12] 2979–87 (1991).

A. Bose et al., "MIMLCs: Microinfiltrated macrolaminated composites . . . ", Advanced Materials and Processes, Jul. 1991, pp. 19–22.

A. N. Virkar et al., "Strengthening of Oxide Ceramics by Transformation-Induced Stresses", J. Am. Ceram. Soc., 70 [3] 164–170 (1987).

R. A. Cutler et al., "Strength Improvement in Transformation-Toughened Alumina by Selective Phase Transformation", J. Am. Ceram. Soc. 70 [10] 714–718 (1987).

Primary Examiner—Patrick J. Ryan
Assistant Examiner—Patrick Jewik
Attorney, Agent, or Firm—Kees van der Sterre

[57] ABSTRACT

Composite articles sintered polycrystalline ceramic reinforcing members in a co-sintered, inorganic, preferably ceramic matrix, formed by disposing arrays of green reinforcement precursor structures in a matrix preform and then consolidating the preform by compacting, debindering, and pressureless sintering, the resulting co-sintered composites exhibiting zero open porosity, high density, and improved work-of-fracture characteristics, are described.

12 Claims, 2 Drawing Sheets

SINTERED INORGANIC COMPOSITES COMPRISING CO-SINTERED TAPE REINFORCEMENT

BACKGROUND OF THE INVENTION

The present invention relates to composite structures, and more particularly to composite structures comprising a matrix phase and a reinforcement phase, wherein the matrix phase is a sintered ceramic or metal and the reinforcement phase consists of elongated ceramic reinforcing elements of sheet or tape configuration which are co-sintered with the matrix to provide strengthened and toughened composite structures.

Ceramic matrix composites comprise a unique subgroup of reinforced composite materials. Such composites typically comprise a glass, glass-ceramic, or ceramic material forming a continuous matrix phase within which are disposed a multiplicity of inorganic reinforcing whiskers or fibers. The presence of fibers strengthens the ceramic matrix material and also imparts a degree of toughness thereto such that, instead of exhibiting sudden, brittle and catastrophic breakage, the composite material fails in a more "graceful" (gradual) manner. This desirable failure mode results from the presence of the fibers which tend to bridge faults in the matrix material and retard crack enlargement by the mechanism of relatively slow and energy dissipating "fiber pullout".

Representative of ceramic matrix composites for high stress, high temperature applications are the fiber reinforced glass-ceramic matrix composites containing silicon carbide fiber reinforcement- These are widely described in the patent literature; representative patents describing such composites include U.S. Pat. Nos. 4,626,515 and 4,615,987.

One economic disadvantage associated with fiber-reinforced composites such as described in these patents relates to the need for hot-pressing at high temperatures and pressures to produce truly dense and void-free products. Difficulties are encountered in attempting to consolidate ceramic matrix materials around rigid fibers and/or whiskers, presumably because the fibers and whiskers oppose the relatively weak forces of sintering and impede the natural shrinkage of the matrix.

A further disadvantage is that high temperature hot-pressing is not well suited to the fabrication of complex structures. Thus products resulting from such processes are significantly restricted as to size and shape. In addition, hot pressing requires costly mold sets, and often a chemically reducing process environment which requires special equipment to maintain.

The numbers and types of fiber and whisker compositions available to the art for use in fiber composite systems are also somewhat limited. This factor limits the range of composition for compatible matrix materials, which in turn limits the options available to the composite designer for "engineering" the fiber/matrix interface. Control over the composition and properties of this interface is a key element in the development of composite systems offering enhanced "fiber pullout" or work-of-fracture behavior.

One method for the fabrication of fiber-reinforced composites while avoiding hot pressing, described in U.S. Pat. No. 5,053,175, is to combine unsintered ceramic fibers with unsintered ceramic matrix sheets by cold-pressing, and then to consolidate the fibers and matrix together by heating. However, this approach can suffer from difficulties relating to inadequate fiber pull-out behavior and/or weakness in the sintered fibers due to consolidation defects.

Yet another approach to the fabrication of tough ceramics involves the development of laminated ceramics comprising weak interlayers or "zones of weakness" in the laminate. Laminar ceramics of this type have been described by D. B. Marshall et. al. in "Enhanced Fracture Toughness in Layered Microcomposites of Ce—ZrO$_2$ and Al2O3", J. Am. Ceram Soc., 74 [12] pages 2979–2987 (1991), and in published European patent application No. EP 0 441 528. These structures, however, are somewhat limited in flexural strength and transverse flexural strength, due to the strong tendency of the products to delaminate at the interlayers.

It is therefore a principal object of the present invention to provide ceramic or metal matrix composite products over a broad range of matrix and reinforcement composition offering both improved strength and improved work of fracture performance.

It is a further object of the present invention to provide new types of reinforced composites which can be fabricated without the need for high temperature hot-press consolidation.

It is a further object of the invention to provide new reinforced ceramic matrix composites with enhanced fracture toughness which also offer high resistance to delamination under flexural stress.

It is a further object of the invention to provide an improved method for the fabrication of ceramic or metal matrix composites which avoids hot pressing while at the same time offering more flexibility in composite design.

Other objects and advantages of the invention will become apparent from the following description thereof.

SUMMARY OF THE INVENTION

The present invention provides a method for making high toughness, refractory composites comprising elongated tape reinforcing members, and wherein high pressure consolidation of the composite is not required in order to develop a microstructure favoring both high strength and high fracture toughness. The present invention develops the required tape (or sheet) reinforcing members for the composite in a selected matrix material by densifying the matrix material, and at the same time the reinforcing members, through concurrent sintering (co-sintering) of the matrix and reinforcing components at no or low applied pressure. Nevertheless, the resulting consolidated structures promise significant strength improvements over sintered fiber-reinforced composites, due to the advantages of tape structures over fiber structures in terms of both a reduced dependence of strength on structural defects and more favorable work of fracture characteristics.

In a first aspect then, the invention includes a method for making a composite article by a sintering process. In accordance with that method, a precursor for a ceramic reinforcing member is first provided. This precursor will be a green ceramic tape or, optionally sheet, ie., it will comprise a combination of a ceramic powder (unsintered) and an organic binder, supplied in the form of a solid but typically flexible sheet or tape configuration.

The reinforcement precursor thus provided will then be combined with a selected powdered sinterable matrix material, preferably comprising a powdered crystalline ceramic material but optionally composed of an alternative ceramic material (a glass or glass-ceramic) or metal. The matrix material can be supplied simply as unmodified (binder-free) powder, or it may comprise a combination of the powder with an organic vehicle or binder. If combined with a vehicle or binder the matrix may be introduced in the form of a liquid slip or suspension, or as a solid dispersion in the configuration of preformed sheet, tape, granular feedstock, or other form.

From the reinforcing members and matrix material thus provided, a preform for the composite article is constructed. To construct the preform, one or a number of lengths of the reinforcement precursor will be arrayed within a volume of the selected matrix material. Arrangement of the precursor in the matrix may be by alternate layering, weaving of the reinforcement precursor with green matrix shapes, random mixing of lengths of reinforcement precursor with loose matrix powder, casting of a matrix-based slip around an array of reinforcement precursor, or any other method permitting the reinforcement to be disposed within and substantially enveloped by a volume of the selected matrix material.

After the reinforcement has been arrayed in the matrix to provide the preform, the preform is next consolidated. Consolidation may involve an initial compaction step, by cold-pressing or the like, if needed to reduce void volume and provide a measure of shape retention for subsequent consolidation processing. Final consolidation involves, first, heating the preform to expel organic binder components therefrom, and thereafter further heating the preform to sinter the matrix material and lengths of precursor into a dense composite article. Substantially pressureless sintering is the preferred consolidation process, although the application of pressure to the preform is not prohibited provided it does not result in undesirable fusion of the matrix and reinforcement as hereinafter more fully described.

The product of consolidation as above disclosed is a composite article of high density and strength, exhibiting essentially zero open porosity and frequently being of near theoretical density (substantially void-free), wherein discrete ceramic reinforcement members have been developed by sintering. Strong interactions between the sintered reinforcing elements and cracks propagating through these sintered composites have been observed, with both reinforcement pull-out and reinforcement/matrix delamination having been demonstrated. Further, it appears that the extent of the pullout or delamination can be controlled by consolidation process variables such as the cold compacting pressure used and/or the level of pressure applied during sintering, if any. Thus, particularly for the case of ceramic matrix materials, significant increases in the levels of fracture energy attainable in these sintered composites are anticipated.

Notwithstanding the advantages of co-sintered sheet or tape structures for matrix reinforcement as herein described, the use of thin laminar elements for reinforcement increases the risk of delamination of the composite structure. Thus it has been found that the proportions of reinforcement in the matrix must be limited in order to avoid composite delamination along reinforcement planes in the article, reinforcement planes meaning, for the purpose of the present description, planes within the composite which are oriented parallel the reinforcing sheet or tape elements within the composite structure.

Based on these considerations, the reinforced composite articles of the invention will include reinforcing elements within specified geometric proportions and limits, in order to achieve the enhancements in physical properties which are required. More particularly, these composites will include, disposed within one or more reinforcement planes within the sintered matrix of ceramic, glass or metal, limited proportions of co-sintered polycrystalline ceramic sheet or tape reinforcing members of specified aspect ratio and thickness.

The cross-sectional aspect ratio (width to thickness ratio) of these sheet or tape reinforcing members will be at least about 3:1, in order to realize useful reductions in the sensitivity of the tape reinforcement to weakening from structural defects. Further, the thickness of the reinforcement will generally not exceed about 250 microns, in order to retain the desirable high surface area and flexural strain-to-failure performance offered by ceramic reinforcement of slight cross-section.

At the same time, the dimensions, volume proportions and/or positioning of the reinforcing elements will be so limited that, in any reinforcement plane in the composite structure, the reinforcement area ratio (the total area occupied by the reinforcing members to the total area of the reinforcement plane) will not exceed about 1:2, and no single reinforcing member will occupy more than 25% of the area of such plane. As hereinafter more fully described, observation of these limitations is an important factor affecting the resistance to delamination and thus the ultimate strengths of these composites.

DESCRIPTION OF THE DRAWINGS

The invention may be further understood by reference to the drawings, wherein.

DETAILED DESCRIPTION

Figure 1:
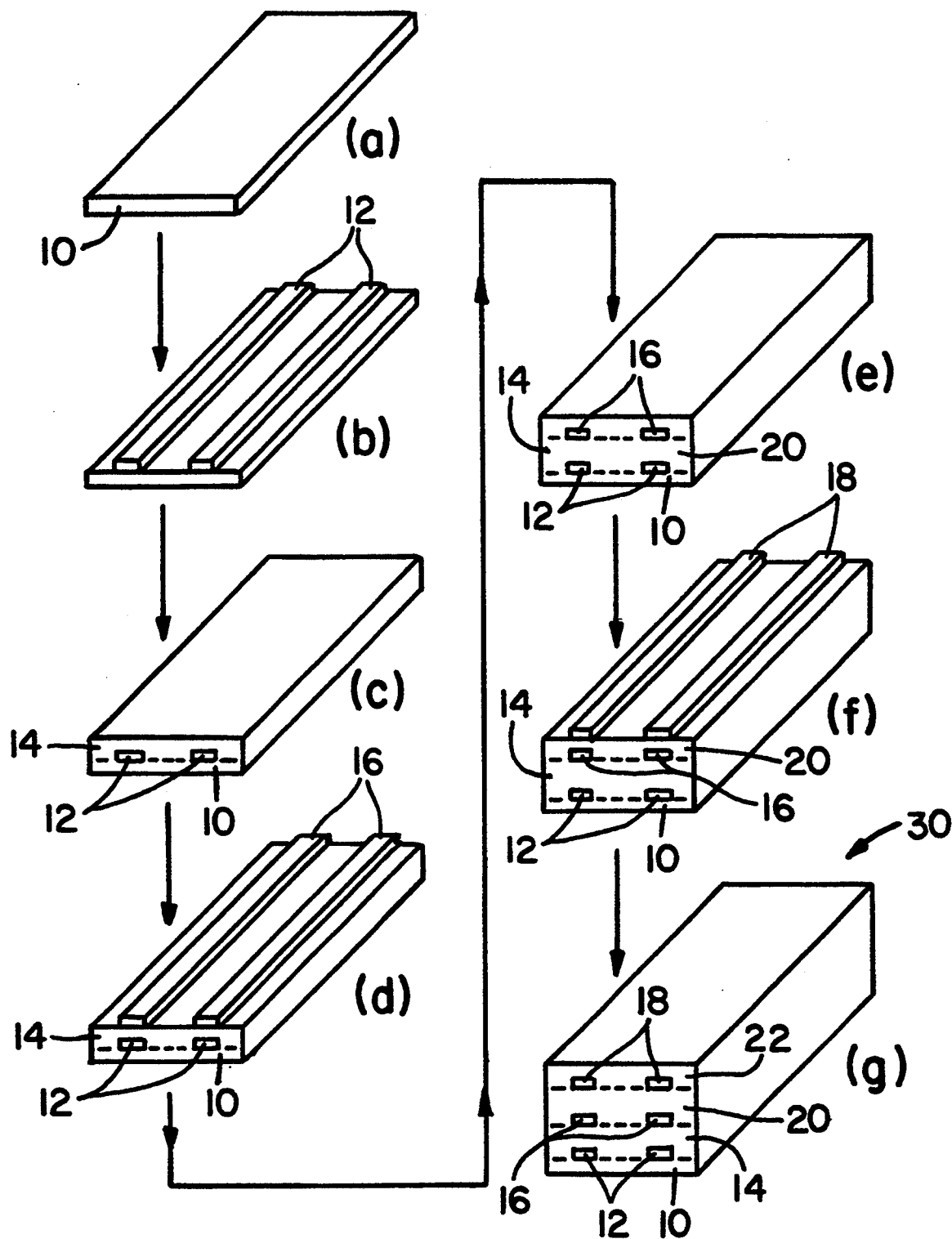
FIG. 1 is a schematic illustration of the construction of a preform for a ceramic matrix composite article provided in accordance with the invention.

The present invention has application to the manufacture of reinforced composite products from a large variety of alternative inorganic matrix materials. Included among such materials are not only sinterable polycrystalline ceramics, but also sinterable glass and metal powders, including powders of intermetallic compounds and powders of glasses which can be thermally crystallized to highly crystalline ceramics (glass-ceramics) in the course of sintering.

Nevertheless, the invention has principal application to the manufacture of composites from sinterable polycrystalline ceramics, since such ceramics offer superior refractoriness but suffer frequently from sudden and brittle fracture. Thus the following description deals principally with the strengthening and toughening of brittle polycrystalline ceramics, including both non-oxide and oxide ceramics, even though the invention is not deemed to be limited thereto.

Referring more specifically to the various types of sinterable polycrystalline ceramics which may be employed, examples of such ceramics include zirconia, stabilized or partially stabilized zirconia, hafnia, alumina, β-alumina, β''-alumina, silica, titania, magnesia, mullite, spinel, chromium oxide, sialon, nasicon, silicon, zirconium, tungsten, and titanium carbides, silicon, titanium and aluminum nitrides, titanium diboride, zircon, cordierite, forsterite, perovskites, pyrochlores, garnets, and monticellite, as well as mixtures or other combinations thereof. In the case of the zirconia and stabilized zirconia compositions which are preferred, a variety of stabilizers including any of the well-known alkaline earth oxide and rare earth oxide stabilizers, alone or in combination, may be present.

In addition to single-phase ceramic systems of the above types, two-or multi-phase ceramics consisting essentially or at least predominantly (greater than 50% by weight) of the above ceramic materials or mixtures thereof, and also comprising other components of compatible composition and properties, may be used. Specifically included in the class of useful ceramics for purposes of composite design in accordance with the invention are powders of crystallizable glasses (ie., glass-ceramic powders). Thus, for example, powders of appropriate alkaline earth aluminosilicate glasses are recognized in the art as being convertible to cordierite and/or anorthite glass-ceramics through appropriate heat treatment.

As will be apparent from the foregoing description, the variety of compositions useful for producing reinforcing tapes or sheets for co-sintered composites is much larger than the field of composition encompassed by commercial fibers. Hence, the number of commercially available fiber compositions is extremely limited, thereby limiting the available options for reinforcement and matrix compositions combinations of compositions.

It is not critical in the design of a composite in accordance with the invention that the matrix and the reinforcing element sinter at exactly the same rate and temperature. In fact, a shrinkage of the reinforcing element away from the matrix during densification can aid in the development of a desirable partially bonded interface. On the other hand, substantial shrinkage of the matrix prior to sintering of the reinforcing elements is generally avoided since such differential shrinkage may generate crack-like voids in the matrix. Of course, as is well known, significant control over sintering rates can be achieved by proper attention to particle size, particle size distribution, and powder composition.

Likewise, the selection of reinforcing element and ceramic matrix compositions having differing thermal expansion coefficients can develop desirable controlled levels of debonding at the matrix/reinforcement interface. Hence, if the debonding is not too severe, then beneficial reinforcement pullout characteristics can be engendered in the product. A higher expansion coefficient in the reinforcement may help to strengthen the matrix, whereas a higher coefficient in the reinforcement could lead to more consistent and predictable fracture behavior in selected systems.

The use of short inorganic whiskers or particulate ceramic additives to ceramic matrix materials of the foregoing types is of course well known to the art, and comprises no part of the present invention. Instead, the present composites utilize "macro" reinforcing elements such as sheets or tapes, these elements being of at least millimeter and more typically centimeter and larger dimensions on at least one and preferably two dimensional axes of the element. The particularly preferred reinforcement is a ceramic tape reinforcement produced by the sintering of green ceramic tape produced by tape-casting, extrusion, or similar processing. Preferred aspect ratios (width to thickness) for these tapes are at least 10:1, and preferred thicknesses do not exceed 100 micrometers, more preferably 50 micrometers.

Tape forms lend themselves to a variety of different architectures, including laminar structures which may, if desired, be easily compacted by cold pressing or the like. In addition, tapes can be configured in a variety of woven arrays so that axes of reinforcement in the composite product can be arbitrarily selected. Finally, unlike conventional composites, similar levels of shrinkage in both the matrix and in the reinforcement will reduce the incidence of consolidation-related defects even in composite structures of complex design.

One concern which must be addressed in the adaptation of ceramic tape as a reinforcement material, however, relates to possible delamination effects limiting the ultimate flexural strength of the composite. Particularly where weak interfacial layer materials such as glass, mica, graphite, or other materials of graphitic structure such as boron nitride are added to enhance reinforcement pull-out behavior as hereinafter described, the use of overwide tapes or sheets can substantially increase the risk of delamination of the entire article in the course of crack propagation. In a sense, these designs can be viewed as retaining insufficient matrix material laterally of the reinforcing sheets to carry the shear loads encountered under flexural stress transverse to the planes of reinforcement.

In any case, reinforcing sheets or tapes occupying an excessive proportion of an article cross-section in any selected plane of reinforcement will render the article prone to shear failure in that plane, and are therefore to be avoided. More particularly, the ratio of the total area of reinforcing tape or sheet in any selected reinforcement plane of the article to the total area of that plane (this ratio being termed the reinforcement area ratio) should be maintained at a value not exceeding about 1:2. Further, no individual reinforcing member should make up more than about 25% of the area of any reinforcement plane. To achieve the best combination of enhanced fracture toughness and high flexural strength in the product, individual tape or sheet reinforcing members should have areas not exceeding about 15% of the area of the reinforcement plane in which they are disposed.

The advantages of sheet or tape over conventional fiber reinforcement are several. First, a single tape can offer a greater crack deflection interface area than a large number of fibers, yet can more easily be positioned for maximum crack-stopping effectiveness within a composite structure. Collections of fibers offering equivalent deflection power must generally be handled as fiber tows, which are difficult to infiltrate with sufficient matrix material for optimum effect. Also, thinner reinforcing elements are preferred over thicker elements to achieve a higher interfacial area per unit volume, and again thin tapes are easier to handle than thin fibers.

One particularly preferred method for providing green ceramic tapes of high solids content which can be sintered to produce thin ceramic foils of excellent strength is disclosed in U.S. Pat. No. 5,089,455. The tape forming methods of that patent can be applied to a wide variety of polycrystalline ceramic materials, and accordingly are useful not only for the fabrication of reinforcement precursors but also for the preparation of matrix dispersions in solid, flexible green sheet form. Moreover, the sintering of green tape or sheet provided as therein described can produce very high strength (1–2 GPa) ceramic structures.

The width and thickness dimensions of green tape precursors to be used for composite reinforcement in accordance with the invention are not greatly different from the dimensions of the final (sintered) reinforcing elements. Especially when utilizing the sheet-forming methods of the aforementioned patent, the high solids content of the sheets results in predictable dimensional shrinkage during co-sintering, for which compensation during green sheet preparation can readily be made.

Of particular interest in the fabrication of composite structures by sintering is the option of utilizing an additional ceramic or other powdered material, during the construction of the preform, as a designed interface material. The function of such an interface material is to control the level of interaction or bonding between the matrix powder and the reinforcement precursor. As is known, overly extensive bonding between matrix and reinforcement phases in a ceramic matrix composite material can nullify expected improvements in toughness and fracture behavior, since the interfacial barriers needed for crack interaction and/or fracture energy dissipation are blurred or erased.

Desirable characteristics of interfacial structures include low fracture strength and/or weak-to-moderate bonding with one or both of the matrix or reinforcement ceramics. Micas and graphite-like materials as well as mechanically weak glasses are examples of such materials. Through the use of these interfacial materials, composites utilizing matrix and reinforcement ceramics of similar or identical composition, or even of chemically incompatible (interreactive) composition, become practical. Likewise, consolidation processing at higher than ambient pressures can be used since the interface can prevent undue adherence between the matrix and the reinforcing elements during sintering.

The use of green tape precursors such as described not only reduces design constraints in the construction of composite preforms, but also facilitates the application of sol-gel or slip coatings to the green tape. This may be a desirable expedient for constructions wherein a designed interface material such as above described, for controlling interaction and/or bonding between the matrix and the reinforcement, is required.

Inasmuch as thin, high-quality sintered ceramic tape of a selected composition can exhibit higher strength than the bulk sintered material, composites of a single material composition (e.g., a zirconia matrix with zirconia tape reinforcing members) exhibiting properties superior to monolithic material can be envisioned. However, the retention of clear discontinuities between the matrix and reinforcement in this type of composite will be critical, and thus interface materials or other techniques designed to preserve and control such discontinuities will be key components of the composite design.

As previously indicated, a large number of traditional ceramic forming methods may be used to combine the matrix powder and reinforcement precursor materials into a composite preform. Such methods may include dry-pressing, cold isostatic or uniaxial pressing, matrix infusion into a preformed tape precursor array by means such as slip casting, pressure casting, electrophoretic deposition, injection molding or extrusion, as well as lamination with aligned, randomly disposed, or arrayed (woven, braided, etc.) precursor reinforcement.

While cold-pressing or other compaction methods can be useful for removing voids from the preform and providing a preform shape suitable for subsequent sintering, some limits on the amount of pressure employed during the compaction step may apply. Undue pressure can interfere with the retention of clear matrix/reinforcement interfaces, which retention is important for retaining a high volume of energy dissipating barriers against crack propagation in the composite material.

After a preform has been constructed and optionally compacted as above described, the removal of binders and the consolidation of the preforms by sintering may be accomplished by conventional ceramic processing methods. Generally, and particularly for all-oxide ceramic systems, no special atmosphere control is needed.

The preferred consolidation procedure is one involving the pressureless sintering of the composites, although the application of pressure during sintering is not ruled out in appropriate cases. However, the employment of hot-pressing or other pressure application techniques during consolidation adds to the cost of the product and is preferably avoided.

A schematic illustration of a simple powder method for constructing a composite preform as above described is provided in FIG. 1 of the drawing. As shown in FIG. 1, a base layer consisting of a quantity of a ceramic powder 10 is first provided [stage (a)]. This layer may be formed, for example, by pressing or by layering the powder in a suitable mold (omitted for clarity). Upon base layer 10 are then disposed a pair of precursors 12 for ceramic tape reinforcement elements, these precursors consisting of flexible green tape formed of a ceramic powder dispersed in a polymer binder [stage (b)]. After the first precursors 12 have been positioned, a second or covering layer of ceramic powder 14, of the same composition as powder 10, is applied over the first layer 10 and precursors 12 [stage (c)].

This process of arraying tape precursors for reinforcing members and covering the precursors with ceramic matrix powder is repeated two more times to incorporate precursor pairs 16 and 18 (identical in composition to precursors 12) and covering powder layers 20 and 22 (identical in composition to powder 10) into the structure [stages (d), (e) and (f)].

The resulting preform 30 [stage (g)] may then be consolidated by sintering, with optional cold pre-pressing if desired, to provide a ceramic matrix composite article. During sintering, the boundaries between the matrix powder layers provided, shown as broken lines in FIG. 1 and corresponding approximately to the planes of reinforcement within the article, will substantially disappear. This fact, together with the limits imposed on the total surface areas of the precursors in each plane hereinabove described, will insure that adequate flexural strength and transverse flexural strength will be retained in the article following sintering.

The invention may be further understood by reference to the following detailed examples, which are intended to be illustrative rather than limiting.

EXAMPLE 1

To prepare precursors for ceramic reinforcing elements for a composite article to be composed predominantly of zirconia ($ZrO_2$), a number of strong but thin and flexible green zirconia tapes are first provided.

These tapes incorporate a stabilized zirconia powder formulated to contain a combination of a yttria stabilizer (2 mole % $Y_2O_3$) and a yttrium niobate toughening phase (2 mole % $YNbO_4$).

The zirconia powder is formulated following the method of U.S. Pat. No. 5,008,221 (expressly incorporated herein by reference) from a combination of commercially available zirconia starting materials and reagent grade $Nb_2O_5$. A commercial yttria-stabilized zirconia powder (Tosoh TZ-3Y powder containing 3 mole % $Y_2O_3$ and the remainder $ZrO_2$, obtained from the Tosoh Chemical Company of Tokyo, Japan) and niobium oxide are milled together in a methanol vehicle using zirconia bead grinding media until the desired concentrations of zirconia and the added oxides are reached.

Green tapes 30–40 micrometers in thickness containing this powders are made by the tape casting process described in U.S. Pat. No. 5,089,455. Thin layers of suspensions of the powders in an organic binder are tape-cast onto a polymethyl methacrylate film carrier, and then dried. To provide reinforcing elements of appropriate configuration, the dried tapes are then cut into sections about 1–2 mm wide by about 1 cm long. Since the green tapes are very thin, the acrylate carrier film is retained as a support for the cut sections to facilitate later handling.

For the ceramic matrix of the composite another commercially available stabilized zirconia powder, ie., yttria ($Y_2O_3$) stabilized zirconia powder containing 4 mole % $Y_2O_3$ as a stabilizer, is used. This powder is commercially obtained as Tosoh TZ-4Y powder from the Tosoh Chemical Company of Tokyo, Japan, and is used in as-received (binder-free) form.

Several composite preforms are constructed using this matrix powder and the described ceramic tape precursors, using the procedure illustrated in FIG. 1 of the drawing. Three arrays of tape precursor are positioned between four alternating layers of loose zirconia powder, with uniaxial die pressing of each succeeding powder layer at moderate pressures (34 MPa) to compact the materials. Control samples composed of four layers of the zirconta powder only (without tape reinforcement precursors) are also made, as is a composite sample comprising randomly distributed sections of tape reinforcement precursor.

Composite preforms produced as described are next compacted by cold isostatic pressing at pressures of 34 MPa, 103 MPa or 303 MPa to remove voids. The pressed preforms are then sintered at 1425° C. for two hours in air to provided consolidated composite ceramics.

After sintering, all samples are fractured on a plane perpendicular the long tape axis, and the fracture surfaces are examined for evidence of delamination and/or pullout of the tape reinforcement from the zirconia matrix. Even though the compositions of the reinforcement and matrix are substantially the same, the composite ceramics incorporating the tape reinforcement elements showed significant interaction between the propagating crack and the tape/matrix interfaces in the composite structure.

Interaction is particularly apparent in the composites cold-isopressed at 34 MPa and at 103 MPa, although even in the composite compacted at 303 MPa some crack interaction with the tape is evident. In none of the composite cases are gross inhomogeneities, such as voids caused by mismatched sintering, observed.

The behavior of the control samples is markedly different from the behavior of the composite samples, the former typically presenting smooth fracture surfaces typical of sintered zirconia ceramics. Some evidence of the original layered structure of the preform can be detected in the control isopressed at 34 MPa, but the other control samples showed smooth fracture surfaces with no detectible laminar features.

Figure 2A:
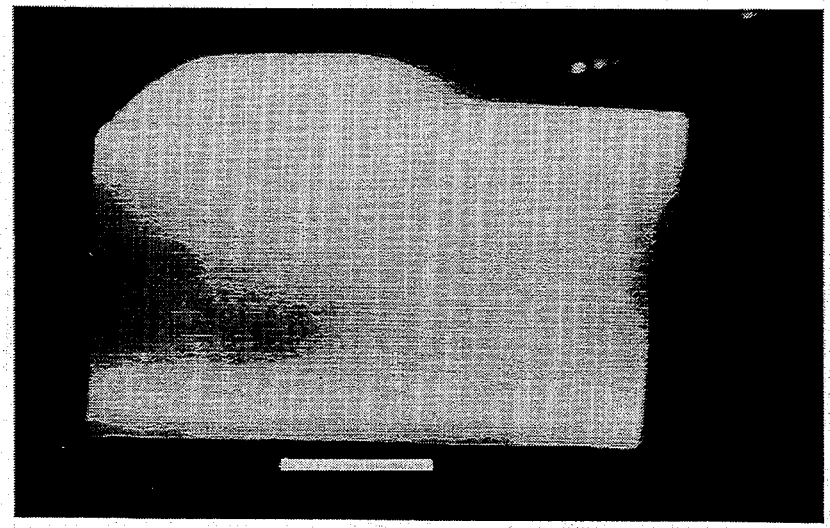
FIGS. 2a and 2b are optical photomicrographs comparing the fracture surface of a ceramic matrix composite article provided in accordance with the invention with the fracture surface of a prior art ceramic article.
Figure 2B:
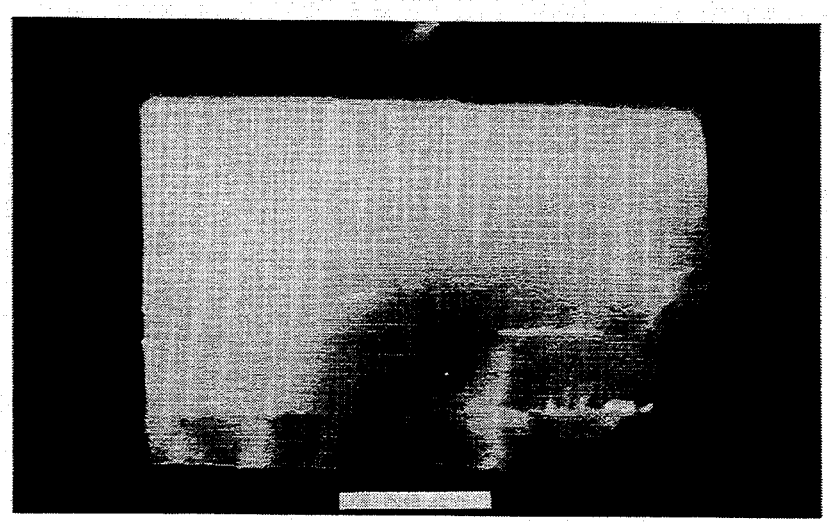

FIGS. 2a and 2b of the drawing comprise optical photomicrographs, taken at a magnification of 20×, showing the transverse fracture surfaces of a control sample and a composite sample, each having been cold-compacted at 34 MPa prior to sintering as above described. The control sample (FIG. 2a) shows no significant fracture interaction with interfaces in the material, while the composite sample (FIG. 2b) shows substantial evidence of interaction between the propagating fracture and the interfaces created by the tape reinforcement.

Although in the case of the sample comprising randomly oriented tape reinforcement the interaction of the fracture with the tape segments is not as large as desired, a lower pressing pressure would be expected to result in a significantly stronger interaction. This suggests that small co-sintered tape segments could enhance the toughness of these ceramics.

EXAMPLE 2

The preform construction procedure of Example 1 is repeated, except that only a single tape reinforcement array positioned between two matrix powder layers is provided. Also the cold isostatic pressing step is omitted in favor of uniaxial pressing of the matrix and tape layers at somewhat higher pressures (but not exceeding about 103 MPa) during preform fabrication. In addition to the TZ-4Y zirconia matrix powder used in the Example 1 samples, several of the composites made in accordance with this Example 2 incorporated TZ-2Y zirconia powder, a powder incorporating only 2 mole % $Y_2O_3$ as a stabilizer and commercially obtained from the Tosoh Chemical Company as above described.

After consolidation by sintering as described in Example 1, the composite samples provided as above described are fractured along a plane transverse to the long axis of the tape reinforcement and the fracture surfaces are analyzed. In general, examination of the fractured samples shows evidence of extensive interaction between the crack front initiated by the fracture and the tape reinforcement present in the ceramic matrices. In one sample, comprising the TZ-2Y zirconia matrix, clear evidence of pull-out of the tape from the ceramic matrix is observed, while in another sample secondary crack propagation produces delamination of one section of the tape reinforcement from the adjoining matrix.

The results indicated in the above composites are not limited to single-composition composite systems, and in fact could be significantly enhanced where tapes differing significantly in composition from the matrix ceramics are used. Moreover, essentially any of the polycrystalline ceramics identified above as being suitable for use as a ceramic matrix may also be used to provide precursors for reinforcing ceramic sheets or tapes.

Particular examples of ceramic compositions suitable for use as sintered reinforcement in these composites include alumina, alumina comprising a minor magnesia addition as a sintering aide, alumina-zirconia mixtures, spinel-alumina mixtures, zirconia, yttria-stabilized zirconia, and niobate-toughened yttria-stabilized zirconia.

Table 1 below sets out specific examples of ceramic systems well adapted to the production strong sintered ceramic tape, and examples of ceramic and/or metal matrix materials compatible with such tapes in terms of physical and chemical properties. Included in Table 1 for each of a number of reinforcing tapes are data respecting the compositions of the ceramic powders used to make the tapes, and peak firing temperatures suitable for converting the green tape precursors to strong durable tape structures. All compositions except those incorporating steel matrix materials can be sintered at ambient pressures in air. The oxides used to prepare the green tapes were as follows: RC-HP-DBM alumina (no MgO additive) from Malakoff Industries of Ralakoff, TX; Tosoh TZ-2Y and TZ-3Y yttria-($Y_2O_3$) stabilized zirconia powders, containing 2 mole % or 3 mole % $Y_2O_3$, respectively, from the Tosoh Chemical Company of Tokyo, Japan; Tosoh TZ-3Y-20A alumina/zirconia powder, containing 3 mole % $Y_2O_3$ and 20 weight % also from the Tosoh Chemical Company, Cernel TM #75 spinel ($MgAlO_4$) powder from the Dow Chemical Corporation of Midland, MI; and, as the source of MgO, hydrous magnesium nitrate from the J. T. Baker Chemical Co. of Phillipsburg, N.J.

Also reported in Table 1 for each of the tape compositions shown are a set of matrix ceramic and/or metals suitable for the production of co-sintered composites incorporating that tape composition.

TABLE 1

| Ceramic Foil Compositions | | |
|---|---|---|
| Reinforcing Tape Composition | Sintering Temp. | Compatible Matrix Compositions |
| alumina (+1% MgO) | 1500° C. | alumina, magnesia-alumina, alumina-saturated spinel, alumina-zirconia, platinum, platinum-rhodium |
| 85% alumina + 15% $ZrO_2$ (TZ − 2Y) | 1500° C. | alumina, alumina-zirconia, alumina-saturated spinel, platinum, platinum-rhodium |
| 85% spinel + 15% alumina | 1580° C. | spinel, alumina-saturated spinel |
| 80% $ZrO_2$ (TZ − 3Y) + 20% alumina | 1400° C. | zirconia, zirconia-alumina steel alloys |
| $ZrO_2$ (TZ − 3Y) | 1300° C. | zirconia, zirconia-alumina, steel alloys |

Among the various advantages of composites such as hereinabove described, particularly for the all-oxide ceramic systems of the Examples and Table, is the capability of achieving consolidation to dense, closed-pore or void-free composites without the need for special atmosphere control or the application of high pressure during consolidation. Thus composite structures of complex configuration can be molded at ambient temperatures by relatively inexpensive compacting processes and apparatus, and then converted to toughened ceramics utilizing conventional firing kilns and sintering methods.

In addition, beneficial properties of all-oxide ceramics, such as good oxidation resistance, high electrical resistivity, and the like are readily achievable in a variety of high-strength, high-toughness ceramic systems. Applications for such ceramics are numerous, including such diverse uses as composite armor, cutting tools, high temperature structural materials and/or wear parts for air-frames or heat engines, electrically insulating substrates for integrated circuits, and precision parts such as magnetic head sliders which have previously been produced by expensive machining techniques.

While the invention has been particularly described above with respect to specific examples of compositions, materials, apparatus and/or procedures, it will be recognized that those examples are presented for purposes of illustration only and are not intended to be limiting. Thus numerous modifications and variations with respect to the compositions, materials, processes and apparatus specifically described herein may be resorted to by those skilled in the art within the scope of the appended claims.

I claim:

1. A composite article comprising a sintered matrix composed of ceramic, glass or metal incorporating one or more co-sintered polycrystalline ceramic reinforcing members disposed within one or more reinforcement planes in the article, wherein:

the matrix is selected from the group consisting of (i) polycrystalline ceramics selected from zirconia, stabilized or partially stabilized zirconia, hafnia, alumina, β-alumina, β″-alimina, silica, titania, magnesia, mullite, spinel, chromium oxide, sialon, nasicon, silicon carbide, zirconium carbide, tungsten carbide, titanium carbide, silicon nitride, titanium nitride, aluminum nitride, titanium diboride, zircon, cordierite, forsterite, perovskites, pyrochlores, garnets, monticellite, and combinations thereof, (ii) alkaline earth aluminosilicate glasses, and (iii) sintered metals composed of platinum, platinum-rhodium, or steel alloys;

the reinforcing members comprise ceramic sheet or tape members having a width:thickness aspect ratio of at least about 3:1 and a thickness not exceeding about 250 micrometers;

the ratio of the total area of the reinforcing members in any reinforcement plane to the total area of the reinforcement plane does not exceed about 1:2; and no reinforcement member occupies more than 25% of the area of any reinforcement plane.

2. An article in accordance with claim 1 wherein the matrix is a polycrystalline ceramic matrix.

3. An article in accordance with claim 2 wherein the matrix and reinforcing members exhibit zero open porosity.

4. An article in accordance with claim 3 which is substantially void-free.

5. An article in accordance with claim 3 wherein the reinforcing members comprise ceramic tape members having a thickness not exceeding about 100 micrometers and a width:thickness aspect ratio of at least about 10:1.

6. An article in accordance with claim 5 wherein no reinforcement member occupies more than 15% of the area of any reinforcement plane.

7. An article in accordance with claim 3 wherein the matrix is a polycrystalline ceramic comprising stabilized or partially stabilized zirconia, and wherein the stabilizer is an oxide selected from the group consisting of alkaline earth oxide stabilizers, rare earth oxide stabilizers, and combinations thereof.

8. An article in accordance with claim 7 which comprises an interface material between the ceramic matrix and the reinforcing members.

9. An article in accordance with claim 8 wherein the interface material is selected from the group consisting of micas, materials of graphitic structure, and glasses.

10. An article in accordance with claim 1 wherein the co-sintered polycrystalline ceramic reinforcing members have a composition selected from the group consisting of alumina, alumina-magnesia, alumina-zirconia, spinel-alumina, zirconia, yttria-stabilized zirconia, and niobate-toughened yttria-stabilized zirconia.

11. An article in accordance with claim 1 wherein the sintered matrix is a sintered polycrystalline ceramic selected from the group consisting of alumina, mixed magnesia-alumina, alumina-saturated spinel, mixed alumina-zirconia, and stabilized zirconia.

12. An article in accordance with claim 1 wherein the sintered matrix is a sintered metal selected from the group consisting of platinum, platinum-rhodium, and steel alloys.

* * * * *

UNITED STATES PATENT AND TRADEMARK OFFICE
CERTIFICATE OF CORRECTION

PATENT NO. : 5,338,598

DATED : August 16, 1994

INVENTOR(S) : Thomas D. Ketcham

It is certified that error appears in the above-indentified patent and that said Letters Patent is hereby corrected as shown below:

On the title page: Abstract

Line 1 of Abstract insert "containing" after "articles"

Col. 1, line 33, "reinforcement-" should be "reinforcement."

Col. 3, line 4 "{" should be "("

Col. 3, line 44 "{" should be "("

Col. 3, line 51 "demonstrated-" should be "demonstrated."

Col. 5, line 2, "mullire" should be "mullite"

Col. 6, line 41, "mere" should be "more"

UNITED STATES PATENT AND TRADEMARK OFFICE
CERTIFICATE OF CORRECTION

PATENT NO. : 5,338,598
DATED : August 16, 1994
INVENTOR(S) : Thomas D. Ketcham

It is certified that error appears in the above-indentified patent and that said Letters Patent is hereby corrected as shown below:

Col. 9, line 43 "zirconta" should be "zirconia"

Col. 9, line 54 insert "to" after "perpendicular"

Col. 11, line 16, "Ralakoff" should be "Malakoff"

Col. 11, line 21 insert "alumina" after "20 weight %"

Col. 13, line 1, "I" should be "1"

Col. 14, line 4, "I" should be "1"

Signed and Sealed this

Tenth Day of January, 1995

BRUCE LEHMAN

Attest:

Attesting Officer

Commissioner of Patents and Trademarks